(12) United States Patent
Park et al.

(10) Patent No.: US 9,158,358 B2
(45) Date of Patent: Oct. 13, 2015

(54) SYSTEM AND METHOD FOR INTELLIGENT MULTIMEDIA-BASED THERMAL POWER MANAGEMENT IN A PORTABLE COMPUTING DEVICE

(71) Applicant: QUALCOMM Incorporated, San Diego, CA (US)

(72) Inventors: Hee-Jun Park, San Diego, CA (US); Jatin Naik, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 379 days.

(21) Appl. No.: 13/910,072

(22) Filed: Jun. 4, 2013

(65) Prior Publication Data
US 2014/0359324 A1 Dec. 4, 2014

(51) Int. Cl.
G06F 1/26 (2006.01)
G06F 1/32 (2006.01)
G06F 1/20 (2006.01)
G06F 5/00 (2006.01)
G06F 12/02 (2006.01)

(52) U.S. Cl.
CPC .............. *G06F 1/3206* (2013.01); *G06F 1/203* (2013.01); *G06F 1/206* (2013.01); *G06F 1/3234* (2013.01); *G06F 5/00* (2013.01); *G06F 12/0292* (2013.01); *G09G 2320/06* (2013.01); *G09G 2320/08* (2013.01); *G09G 2330/021* (2013.01); *G09G 2330/045* (2013.01); *G09G 2340/0407* (2013.01); *G09G 2340/0435* (2013.01); *G09G 2360/08* (2013.01)

(58) Field of Classification Search
CPC ..... G06F 1/206; G06F 1/3206; G06F 1/3234; G06F 12/0292

USPC .................. 713/300, 320, 321, 323
See application file for complete search history.

(56) References Cited

U.S. PATENT DOCUMENTS

| 8,321,702 B2 | 11/2012 | Kaneko et al. |
| 2007/0146236 A1 | 6/2007 | Kerofsky et al. |
| 2011/0205259 A1 | 8/2011 | Hagood |
| 2012/0212481 A1 | 8/2012 | Zipnick et al. |
| 2012/0271481 A1 | 10/2012 | Anderson et al. |
| 2012/0287571 A1 | 11/2012 | Santos |

FOREIGN PATENT DOCUMENTS

| EP | 2560091 A2 | 2/2013 |
| WO | 2008115464 A1 | 9/2008 |

OTHER PUBLICATIONS

International Search Report and Written Opinion—PCT/US2014/040862—ISA/EPO—Sep. 15, 2014.

*Primary Examiner* — Michael J Brown
(74) *Attorney, Agent, or Firm* — Smith Risley Tempel Santos LLC

(57) ABSTRACT

Various embodiments of methods and systems for intelligent multimedia-based thermal power management implemented in a portable computing device ("PCD") are disclosed. To reduce or increase power consumption in the PCD, embodiments adjust one or more visual multimedia parameters, the settings of which contribute to power consumption associated with an overall multimedia workload. The selection of visual multimedia parameters for setting adjustment is a function of the change in user experience versus the change in power consumption that will likely result from the setting adjustment. Exemplary visual multimedia parameters for which settings may be adjusted by certain embodiments include, but are not limited to, color depth, display brightness, GPU processing resolution, image dynamics algorithm selection, resolution scaling ratios and frames per second processing rates.

40 Claims, 6 Drawing Sheets

Exemplary Visual Multimedia Parameter Graphs

SYSTEM AND METHOD FOR INTELLIGENT MULTIMEDIA-BASED THERMAL POWER MANAGEMENT IN A PORTABLE COMPUTING DEVICE

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

One unique aspect of PCDs is that they typically do not have active cooling devices, like fans, which are often found in larger computing devices such as laptop and desktop computers. Instead of using fans, PCDs may rely on the spatial arrangement of electronic packaging so that two or more active and heat producing components are not positioned proximally to one another. Many PCDs may also rely on passive cooling devices, such as heat sinks, to manage thermal energy among the electronic components which collectively form a respective PCD.

The reality is that PCDs are typically limited in size and, therefore, room for components within a PCD often comes at a premium. As such, there rarely is enough space within a PCD for engineers and designers to mitigate thermal degradation or failure of processing components by using clever spatial arrangements or strategic placement of passive cooling components. Therefore, current systems and methods rely on various temperature sensors embedded on the PCD chip and elsewhere to monitor the dissipation of thermal energy and then use the measurements to trigger application of thermal power management techniques that adjust workload allocations, processing speeds, etc. to reduce thermal energy generation.

For example, under a heavy graphics processing workload associated with a gaming application, current systems and methods throttle the voltage and frequency of a graphics processing unit ("GPU") to mitigate excessive thermal energy generation. In doing so, the graphics processing workload associated with the gaming application is not reduced but, rather, the speed at which the workload is processed is slowed. The inevitable result is that thermal energy generation is mitigated at the expense of the user experience ("Ux") as measured in user perceived quality of service ("QoS"). That is, throttling the GPU accomplishes the goal of reducing thermal energy generation by the GPU but causes the user experience to suffer due to a slowed graphics output. As such, current systems and methods for mitigating thermal energy generation by multimedia processing components in a PCD may unnecessarily impact the QoS provided to a user.

Therefore, what is needed in the art is a system and method for intelligent multimedia-based thermal power management in a PCD. More specifically, what is needed in the art is a system and method that manages thermal energy generation in multimedia processing components by modifying the multimedia-based workload via selective adjustments of multimedia parameter settings.

SUMMARY OF THE DISCLOSURE

Various embodiments of methods and systems for intelligent multimedia-based thermal power management techniques implemented in a portable computing device ("PCD") are disclosed. An exemplary embodiment of a method for intelligent multimedia-based thermal power management comprises monitoring a condition in the PCD associated with power consumption. Depending on an embodiment, the condition may be an aggregate power consumption level or a temperature measurement associated with a component or aspect of the PCD (such as the "skin" temperature of the PCD or the die junction temperature of a graphical processing unit), or both. The condition is compared to a predefined threshold associated with the condition, such as a temperature threshold or power consumption budget. Based on the comparison of the condition to the predefined threshold, the method may determine that an adjustment to power consumption is warranted.

Determining an adjustment to power consumption triggers an adjustment in one or more visual multimedia parameters the settings of which contribute to power consumption associated with an overall multimedia workload. Data indicative of the active settings of a plurality of visual multimedia parameters is collected and performance graphs for each of the visual multimedia parameters are queried. The active setting of each visual multimedia parameter is then mapped to its respective graph such that a tangent with a slope is defined. The tangent slopes associated with each visual multimedia parameter are compared and, based on the comparison of tangent slopes, a first visual multimedia parameter is selected for its active setting to be adjusted. Advantageously, adjusting the active setting of the visual multimedia parameter operates to modify the overall multimedia workload such that power consumption in the PCD is adjusted accordingly.

Notably, the adjustment to power consumption may be a reduction in power consumption (for the purpose of reducing thermal energy generation) or an increase in power consumption (for the purpose of improving quality of service to a user), depending on the particular situation. In either scenario, the selection of visual multimedia parameters for setting adjustment is a function of the change in user experience versus the change in power consumption that will likely result from the setting adjustment. That is, in a scenario where an adjustment to power consumption comprises determining a reduction in power consumption, embodiments may select the visual multimedia parameter for which adjustment of the active setting will provide the least detrimental impact on user experience per unit reduction in power consumption. Similarly, in a scenario where an adjustment to power consumption comprises determining an increase in power consumption, embodiments may select the visual multimedia parameter for which adjustment of the active setting will provide the most positive impact on user experience per unit increase in power consumption.

Exemplary visual multimedia parameters for which settings may be adjusted by certain embodiments include, but are not limited to, color depth, display brightness, GPU processing resolution, image dynamics algorithm selection, resolution scaling ratios and frames per second processing rates.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
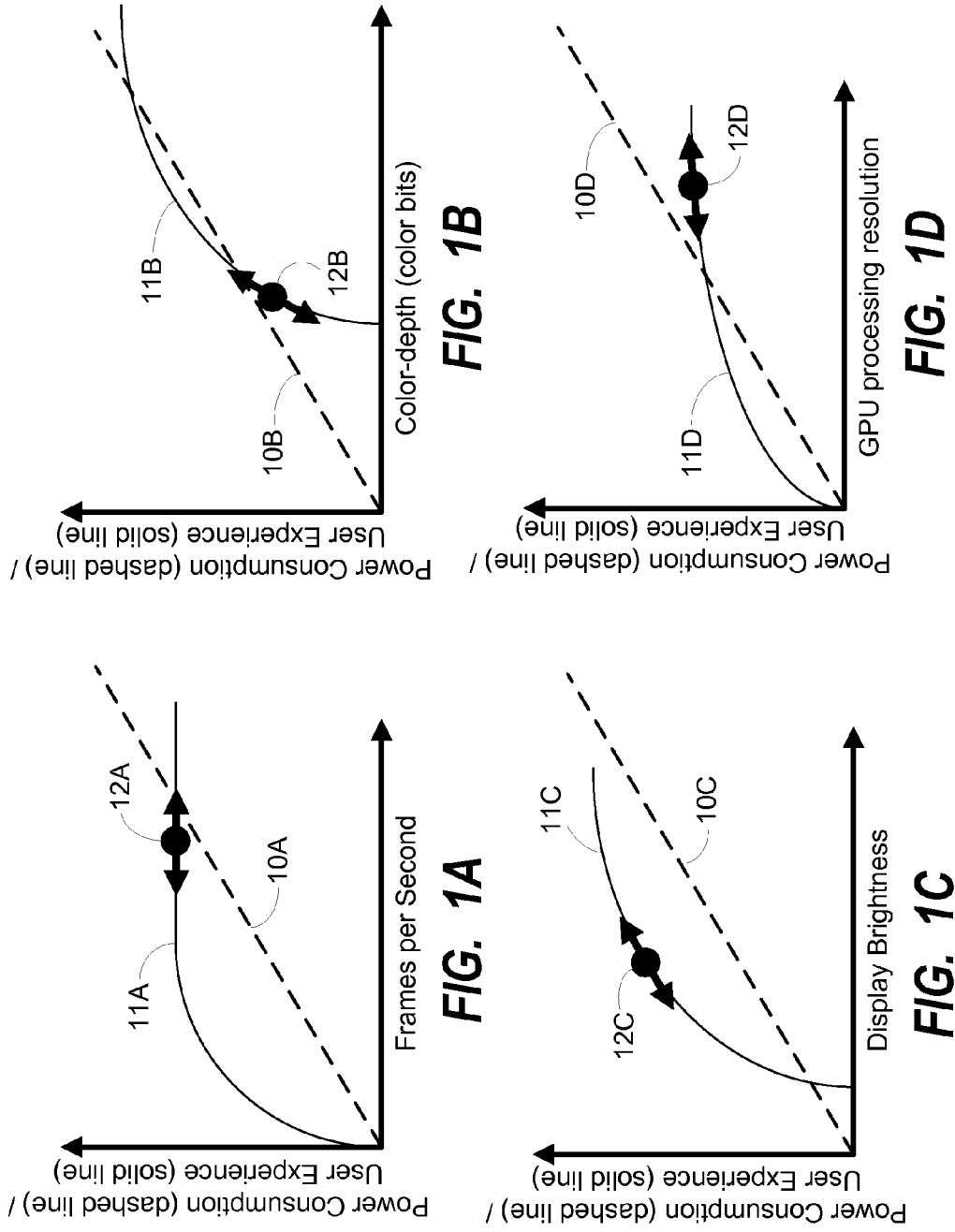
FIGS. 1A-1D are exemplary visual multimedia parameter graphs, each illustrating a relationship between a visual multimedia parameter setting, user experience relative to the setting and power consumption associated with the setting.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "multimedia processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload," "multimedia workload" and the like are used interchangeably and generally directed toward the processing burden, or percentage of processing burden, associated with a given processing component in a given embodiment. Further to that which is defined above, a "graphical processing component" or "multimedia processing component" may be any component having one or more visual multimedia parameters with which it is associated that operate to define a multimedia workload. To this end, a graphical processing component may include, but is not limited to including, a graphical processing unit, a display controller, a display, a video/photo encoder, an image sensor processor for front/rear cameras, a core, a main core, a sub-core, a processing area, a hardware engine, etc. or any component residing within, or external to, an integrated circuit within a portable computing device and configured to process a multimedia workload.

In this description, the terms "thermal mitigation technique(s)," "thermal policies," "thermal power management," "thermal mitigation measure(s)," "throttling" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

Managing thermal energy generation in a PCD, without unnecessarily impacting quality of service ("QoS"), can be accomplished by monitoring a power budget and/or one or more sensor measurements that correlate with the temperatures of silicon junctions in core(s), package on package ("PoP") memory components, and/or the outer shell, i.e. "skin," of the PCD. By closely monitoring the power budget and/or temperatures associated with components, an intelligent multimedia thermal policy manager ("IM-TPM") module in a PCD may systematically and individually adjust performance settings of visual multimedia parameters in an effort to mitigate thermal energy generation and optimize user experience. Advantageously, by selectively adjusting visual multimedia parameter settings as a function of user experience, intelligent multimedia thermal power management systems and methods can optimize QoS under any multimedia workload.

Notably, although exemplary embodiments of intelligent multimedia thermal power management methods are described herein in the context of graphical processing components in the form of a graphical processing unit ("GPU"), a display controller, a display, a video/photo encoder, and an image sensor processor for front/rear cameras, application of intelligent multimedia thermal power management methodologies are not limited to such graphical processing components. It is envisioned that embodiments of intelligent multimedia thermal power management methods may be extended to any component that may reside within a system on a chip ("SoC") and have a workload that is adjustable based on one or more parameter settings such as, but not limited to, a modem processor, a camera, etc.

FIGS. 1A-1D are exemplary visual multimedia parameter graphs, each illustrating performance curves that define a relationship between a visual multimedia parameter setting, user experience relative to the setting and power consumption associated with the setting. Referring to FIG. 1A, moving left to right along the x-axis of the graph represents an increase in the number of frames per second ("FPS") at which a multimedia workload may be processed and rendered. As one of ordinary skill in the art will recognize, an increase in the FPS rate requires an increase in the power consumed (which also correlates to an increase in thermal energy generation) by the multimedia processing component associated with the FPS rate (such as a GPU). Accordingly, moving upward along the y-axis represents an increase in power consumption and the dashed line 10A represents the correlation between FPS rate and power consumption, as is understood by one of ordinary skill in the art.

In the FIG. 1A graph, the y-axis may also represent a user experience ("Ux") level where moving upward along the y-axis correlates with an improved Ux. Accordingly, as represented by the solid line curve 11A, there is a correlation between the FPS level and the Ux level. Referring to the curve 11A, the initially steep slope of the curve 11A illustrates that an increase in the FPS level from a relatively low level may produce a significant increase in Ux. By contrast, the flatter portion of the slope 11A which corresponds to higher FPS levels illustrates that further increases in FPS levels will not produce noticeable increases in Ux levels once the FPS level is already relatively high.

With the above in mind, one of ordinary skill in the art will recognize that an increase or decrease in the FPS level, when the FPS level is initially relatively low, will generate a larger impact on Ux per watt of power consumption than when the initial FPS level is initially relatively high. For example, the point 12A represents an exemplary initial FPS level that is relatively high, i.e. the multimedia processing component associated with the FPS visual multimedia parameter is processing a multimedia workload at a high processing speed. As such, the slope of a tangent to curve 11A at point 12A is relatively flat and indicates that an adjustment down in the FPS level will generate power savings (thus lowering thermal energy generation) without significant impact to Ux. Similarly, an adjustment up in the FPS level will require increased power consumption (thus increased thermal energy generation) without a positive impact on Ux.

As one of ordinary skill in the art will understand, the FPS visual multimedia parameter affects the speed at which a multimedia workload is processed. One or more other visual multimedia parameters, however, such as, but not limited to, color depth, display brightness, GPU processing resolution, image dynamics and resolution scaling ratio may cooperate to determine an aggregate multimedia workload that must be processed by one or more multimedia processing components or determine a power consumption level required to render a multimedia output. Advantageously, therefore, adjustment of one or more of the visual multimedia parameters may either reduce the multimedia workload such that less power consumption is required to process the workload or may save in power consumption required to render an output of a multimedia workload.

Referring to FIG. 1B, moving left to right along the x-axis of the graph represents an increase in the color depth ("color bits") at which a multimedia output may be rendered. As one of ordinary skill in the art will recognize, an increase in the color depth level requires an increase in the power consumed (which also correlates to an increase in thermal energy generation) by the multimedia processing component associated with the color depth parameter (such as a GPU). That is, the higher the color depth parameter setting, the higher the workload that must be processed in order to render a graphical output. Accordingly, moving upward along the y-axis represents an increase in power consumption and the dashed line 10B represents the correlation between color depth level and power consumption, as is understood by one of ordinary skill in the art.

In the FIG. 1B graph, the y-axis may also represent a Ux level where moving upward along the y-axis correlates with an improved Ux. Accordingly, as represented by the solid line curve 11B, there is a correlation between the color depth level and the Ux level. Referring to the curve 11B, the initially steep slope of the curve 11B illustrates that an increase in the color depth level from a relatively low level may produce a significant increase in Ux. By contrast, the upper portion of the slope 11B which corresponds to higher color depth levels illustrates that further increases in color depth levels will not produce noticeable increases in Ux levels once the color depth level is already relatively high. That is, the user may not notice or appreciate the increased color depth level and, as such, an increase will not improve Ux.

With the above in mind, one of ordinary skill in the art will recognize that an increase or decrease in the color depth level, when the color depth level is initially relatively low, will generate a larger impact on Ux per watt of power consumption than when the initial color depth level is initially relatively high. For example, the point 12B represents an exemplary initial color depth level that is relatively low, i.e. the multimedia processing component associated with the color depth visual multimedia parameter is processing a multimedia workload associated with a relatively low color depth setting. As such, the slope of a tangent to curve 11B at point 12B is relatively steep and indicates that an adjustment down in the color depth setting will generate little power savings (thus saving little thermal energy generation) while significantly impacting Ux detrimentally. Similarly, an adjustment up in the color depth setting will require only a small increase in power consumption (thus a small increase in thermal energy generation) while providing a significant and positive impact on Ux.

Referring to FIG. 1C, moving left to right along the x-axis of the graph represents an increase in the display brightness with which a multimedia output may be rendered. As one of ordinary skill in the art will recognize, an increase in the display brightness setting requires an increase in the power consumed (which also correlates to an increase in thermal energy generation) by the multimedia processing component associated with the display brightness parameter (such as a display screen). That is, the higher the display brightness parameter setting, the higher the power level required in order to render a graphical output. Accordingly, moving upward along the y-axis represents an increase in power consumption and the dashed line 10C represents the correlation between display brightness and power consumption, as is understood by one of ordinary skill in the art.

In the FIG. 1C graph, the y-axis may also represent a Ux level where moving upward along the y-axis correlates with an improved Ux. Accordingly, as represented by the solid line curve 11C, there is a correlation between the display brightness setting and the Ux level. For the most part, as one of ordinary skill in the art will recognize, a brighter display setting is favorable to a user over a dim display setting. Referring to the curve 11C, the initially steep slope of the curve 11C illustrates that an increase in the display brightness from a relatively low level may produce a significant increase in Ux. By contrast, the upper portion of the slope 11C which corresponds to higher display brightness illustrates that further increases in display brightness will not produce noticeable increases in Ux levels once the display brightness setting is already relatively high. That is, the user may not notice or appreciate the increased display brightness level and, as such, an increase in display brightness will not improve Ux.

With the above in mind, one of ordinary skill in the art will recognize that an increase or decrease in the display brightness, when the display brightness setting is initially relatively low, will generate a larger impact on Ux per watt of power consumption than when the initial display brightness setting is initially relatively high. For example, the point 12C represents an exemplary initial display brightness setting that is neither high nor low, i.e. the multimedia processing component associated with the display brightness visual multimedia parameter is rendering a multimedia output associated with a moderate display brightness setting. As such, the slope of a tangent to curve 11C at point 12C indicates that an adjustment down in the display brightness setting will generate moderate power savings (thus saving moderate amounts of thermal energy generation) while moderately impacting Ux. Similarly, an adjustment up in the display brightness setting will require a moderate increase in power consumption (thus a moderate increase in thermal energy generation) while providing a positive though moderate impact on Ux.

Referring to FIG. 1D, moving left to right along the x-axis of the graph represents an increase in the GPU processing resolution at which a multimedia workload may be processed and rendered. As one of ordinary skill in the art will recognize, an increase in the GPU processing resolution setting requires an increase in the power consumed (which also correlates to an increase in thermal energy generation) by the multimedia processing component associated with the GPU processing resolution setting (such as a GPU). Accordingly, moving upward along the y-axis represents an increase in power consumption and the dashed line 10D represents the correlation between GPU processing resolution and power consumption, as is understood by one of ordinary skill in the art.

In the FIG. 1D graph, the y-axis may also represent a user experience ("Ux") level where moving upward along the y-axis correlates with an improved Ux. Accordingly, as represented by the solid line curve 11D, there is a correlation between the GPU processing resolution setting and the Ux level. Referring to the curve 11D, the initially steep slope of the curve 11D illustrates that an increase in the GPU processing resolution from a very low setting may produce a significant increase in Ux. By contrast, the flatter portion of the slope 11D which corresponds to moderate and high GPU processing resolution settings illustrates that further increases in GPU processing resolution beyond relatively low levels will not produce noticeable increases in Ux levels.

With the above in mind, one of ordinary skill in the art will recognize that an increase or decrease in the GPU processing resolution setting, when the GPU processing resolution setting is initially very low, will generate a more appreciable impact on Ux per watt of power consumption than when the initial GPU processing resolution setting is initially relatively moderate or even high. For example, the point 12D represents an exemplary initial GPU processing resolution setting that is relatively high, i.e. the multimedia processing component associated with the GPU processing resolution visual multimedia parameter is processing a multimedia workload at a high resolution level. As such, the slope of a tangent to curve 11D at point 12D is relatively flat and indicates that an adjustment down in the GPU processing resolution setting will generate power savings (thus lowering thermal energy generation) without significant impact to Ux. Similarly, an adjustment up in the GPU processing resolution setting will require increased power consumption (thus increased thermal energy generation) with no noticeable impact on Ux.

Based on a weighted sum calculation of Ux from visual multimedia parameter settings, embodiments of the system and method may systematically adjust one or more parameter settings to optimize Ux while adjusting overall power consumption. As a non-limiting example, visual multimedia parameters monitored by a certain embodiment may include FPS rate, GPU processing resolution setting, color depth setting (color bits used to render graphics), display brightness level, motion estimation algorithm selection and a 3-D image algorithm selection. As the PCD is in operation, the settings and levels of the various parameters collectively contribute to an overall Ux level and an overall power consumption level associated with multimedia processing. As explained above, an increase or decrease in the active setting for any one of the parameters may affect both overall Ux and overall power consumption. Advantageously, in the event that power consumption should be increased or decreased, embodiments seek to make such power consumption adjustments (and, by extension, thermal energy generation adjustments) in a manner that optimizes Ux.

Figure 2:
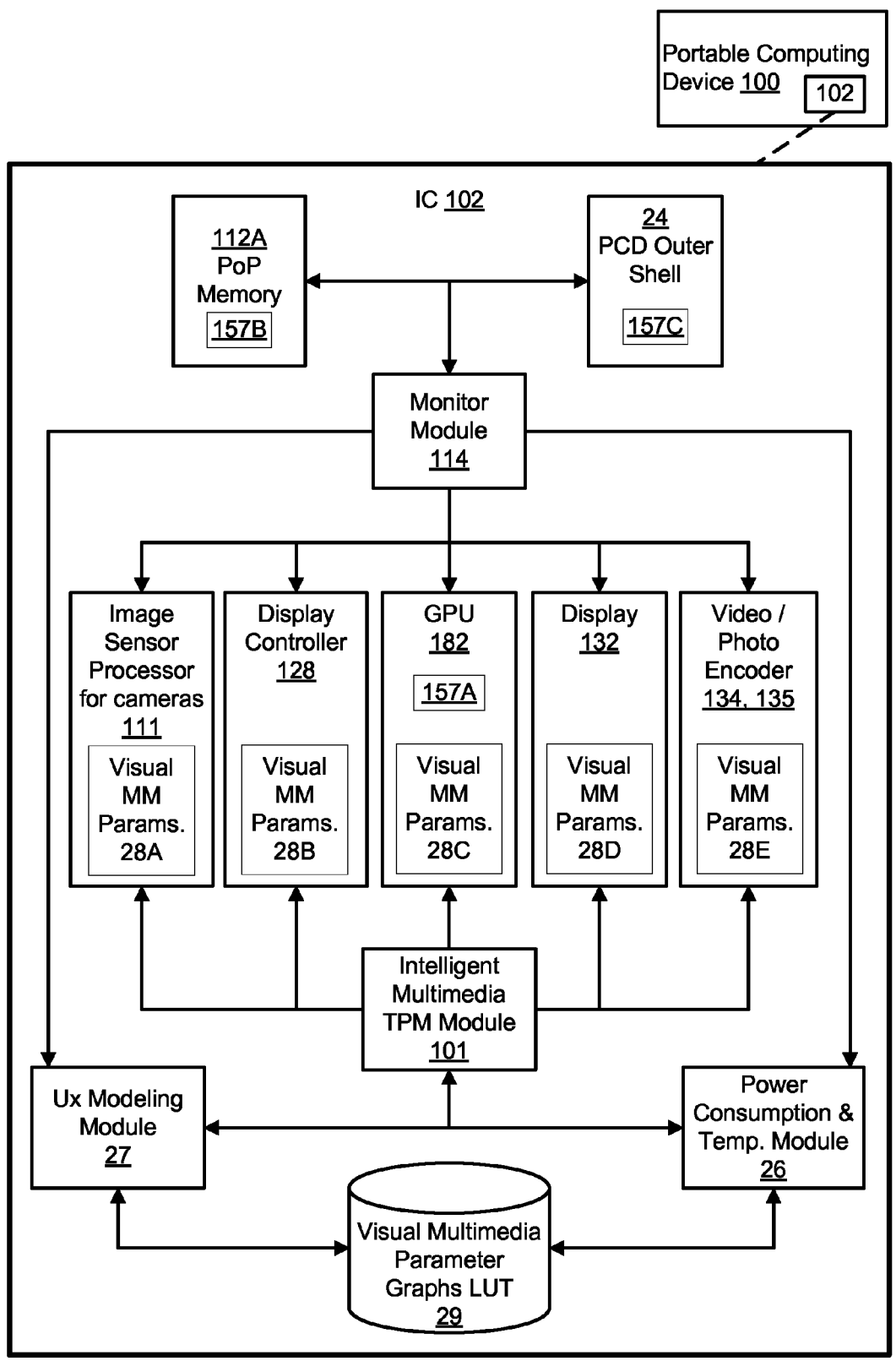
FIG. 2 is a functional block diagram illustrating an embodiment of an on-chip system for implementing intelligent multimedia-based thermal power management in a portable computing device ("PCD") through selective adjustment of one or more visual multimedia parameters.

FIG. 2 is a functional block diagram illustrating an embodiment of an on-chip system 102 for implementing intelligent multimedia-based thermal power management in a portable computing device ("PCD") 100 through selective adjustment of one or more visual multimedia parameters 28. Advantageously, by selectively adjusting one or more visual multimedia parameters 28 associated with multimedia workload and/or multimedia output, embodiments of the systems and methods may address thermal energy mitigation needs without overly impacting the overall user experience ("Ux").

In general, the system employs three main modules which, in some embodiments, may be contained in one or two modules: (1) a power consumption and temperature ("PCT") module 26 for analyzing temperature readings and visual multimedia parameter 28 settings monitored by a monitor module 114 (notably, monitor module 114 and PCT module 26 may be one and the same in some embodiments) and determining thermal power management actions; (2) a User Experience ("Ux") modeling module 27 for selecting visual multimedia parameter adjustments according to thermal power management actions received from PCT module 26; and (3) an Intelligent Multimedia Thermal Power Management ("IM-TPM") module 101 for adjusting visual multimedia parameter 28 settings according to instructions received from Ux modeling module 27. Advantageously, embodiments of the system and method that include the three main modules optimize the overall Ux with multimedia processing and output while maintaining power consumption of multimedia processing components within a predetermined power budget and/or temperature levels beneath acceptable thresholds.

In the exemplary embodiment of FIG. 2, monitor module 114 monitors various visual multimedia parameter 28 settings and levels associated with multimedia processing components display controller 128, GPU 182, display 132, video/photo encoder 134,135 and image sensor processor for front/rear cameras 111. Also, the monitor module 114 may monitor temperature sensors 157 associated with various components or aspects of the PCD 100 including, but not limited to, silicon junctions in core(s) of GPU 182, package on package ("PoP") memory components 112A, and/or the outer shell 24, i.e. "skin," of the PCD 100. The monitor module 114 may relay data indicative of the active settings of the visual multimedia parameters 28 and/or the temperatures measured by the sensors 157 to the PCT module 26.

From the data provided by the monitor module 114, the PCT module 26 may recognize that a thermal temperature threshold has been exceeded and determine that thermal energy generation associated with multimedia processing components should be mitigated. Similarly, from the data provided by the monitor module 114 regarding active settings of visual multimedia parameters 28, the PCT module 26 may calculate an overall power consumption level of the multimedia processing components 111, 128, 182, 132, 134, 135 and compare it to a predetermined power budget. To calculate the overall power consumption level from the active settings of the visual multimedia parameters 28, the PCT module 26 may query the visual multimedia parameter graph lookup table ("LUT") 29 which contains visual multimedia parameter graphs such as those depicted in FIG. 1. Advantageously, for each active setting monitored by the monitor module 114, the PCT module 26 may map a point 12 on a curve 11 in the appropriate visual multimedia parameter graph and, based on the x-axis value of the point 12, determine a power consumption associated with the active setting of the visual multimedia parameter. Subsequently, an aggregate power consumption level associated with all the visual multimedia parameter settings may be calculated by the PCT module 26 and compared to a predefined power budget.

If a temperature threshold or a power budget has been exceeded, then the PCT module 26 may instruct the Ux modeling module 27 to determine appropriate adjustments to one or more of the active settings of the visual multimedia parameters 28. Similarly, if the PCT module 26 determines that there is available headroom in the power budget, i.e. that user experience may be improved by an increase in power consumption that will not cause the power budget to be exceeded, then the PCT module 26 may instruct the Ux modeling module 27 to determine appropriate adjustments to one or more of the active settings of the visual multimedia parameters 28.

The Ux modeling module 27, upon receiving instructions from the PCT module 26 to adjust one or more visual multimedia parameter 28 settings either up or down, queries LUT 29 and compares visual multimedia parameter graphs associated with parameters 28 that are eligible for adjustment. Having also received the active settings of the visual multimedia parameters 28 from the monitor module 114, the Ux modeling module 27 maps a point 12 on a curve 11 in the appropriate visual multimedia parameter graph for each active setting. Based on the slope of the tangent for each point 12, the Ux modeling module 27 may determine which parameter(s) 28 should be adjusted in order to optimize the user experience within the power consumption constraints dictated by the PCT module 26.

For instance, if the PCT module 26 has instructed that thermal energy generation should be mitigated by reducing power consumption, the Ux modeling module 27 may identify those tangents having slopes that are relatively flat and subsequently select the associated parameters for adjustment. In this way, the detrimental impact on user experience may be kept at a minimum per unit of power saved as a result of an adjustment. Similarly, if the PCT module 26 has instructed that power consumption may be increased without exceeding a power budget, the Ux modeling module 27 may identify those tangents having slopes that are relatively steep and subsequently select the associated parameters for adjustment. In this way, the impact on user experience may be maximized per additional unit of power consumed as a result of an adjustment.

Notably, it is envisioned that some embodiments of the system and method may identify the single parameter 28 having the most favorable tangent slope and then adjust the setting of the parameter 28 only as much as is necessary to capture the targeted power savings or consumption increase. Other embodiments may adjust a first parameter setting only up to the point that the adjusted setting defines a tangent having a slope that is less favorable than the slope of a tangent associated with a second parameter 28, at which point the setting of the second parameter is adjusted accordingly. Still other embodiments, instead of making a setting adjustment and gathering feedback from the monitor module 114 before determining a second setting adjustment, may calculate a plurality of adjustments across multiple parameters 28 and then make all adjustments at the same time.

Returning to the FIG. 2 embodiment, the Ux modeling module 27 may instruct the IM-TPM module 101 to make certain adjustments in the settings associated with one or more of the visual multimedia parameters 28. Notably, as explained above, the visual multimedia parameters 28 may be associated with any power consuming component, aspect or function of the PCD 100 that affects multimedia processing or output. In the exemplary embodiment of FIG. 2, five multimedia processing components are illustrated in the form of a display controller 128, a GPU 182, a display 132, a video/photo encoder 134,135, and an image sensor processor for front/rear cameras 111. Exemplary visual multimedia parameters 28A may include, but are not limited to, image resolution settings, frames per second ("FPS") rates, image noise reduction levels, anti-shake image stabilization availability, color/contrast adjustment availability and image enhancement filter settings. Exemplary visual multimedia parameters 28B may include, but are not limited to, a resolution scaling ratio (original to display), the adjustment of which may directly affect power consumption by the display controller 128 and corresponding user experience and FPS rate for multi-image layer composition. Exemplary visual multimedia parameters 28C may include, but are not limited to, various image dynamic algorithms, FPS rates, GPU processing resolution setting, and color depth bits settings, the adjustments of which may directly affect power consumption by the GPU 182 and corresponding user experience. Exemplary visual multimedia parameters 28D may include, but are not limited to, display brightness setting, the adjustment of which may directly affect power consumption by the display and corresponding user experience. Exemplary visual multimedia parameters 28E may include, but are not limited to, video encoding compression ratio settings, video recording resolution settings, FPS rates of video recording, FPS of burst photo shots (shutter interval settings) and encoding processing speed (latency settings) per photo. Other exemplary parameters 28 associated with the exemplary multimedia sub-systems 111, 128, 182, 132, 134, 135 include, but are not limited to:

| Sub-system | Exemplary Visual Multimedia Parameters 28 |
|---|---|
| GPU 182 | GPU processing resolution (Graphics processing resolution) |
| | Color-depth (color bits) |
| | Frames per second for 3D/2D graphics processing |
| | Various image enhancement filters (on/off) |
| | Frame per second for multi-image layer composition |
| Display Controller 128 | Resolution scaling (original to display) |
| | Frame per second for multi-image layer composition |
| Display device 132 | Display brightness |
| Video/Photo encoder 134, 135 | Video encoding compression ratio |
| | Video recording resolution |
| | Frames per second of video recording |
| | Frames per second of burst photo shots (shutter intervals) |
| | Encoding processing speed (latency) per photo |
| Image sensor processor for the front/rear cameras 111 | Image resolution |
| | Frames per second |
| | Image noise reduction level |
| | Anti-shake image stabilization (on/off) |
| | Color/contrast adjustment (on/off) |
| | Various image enhancement filters (on/off) |

Figure 3:
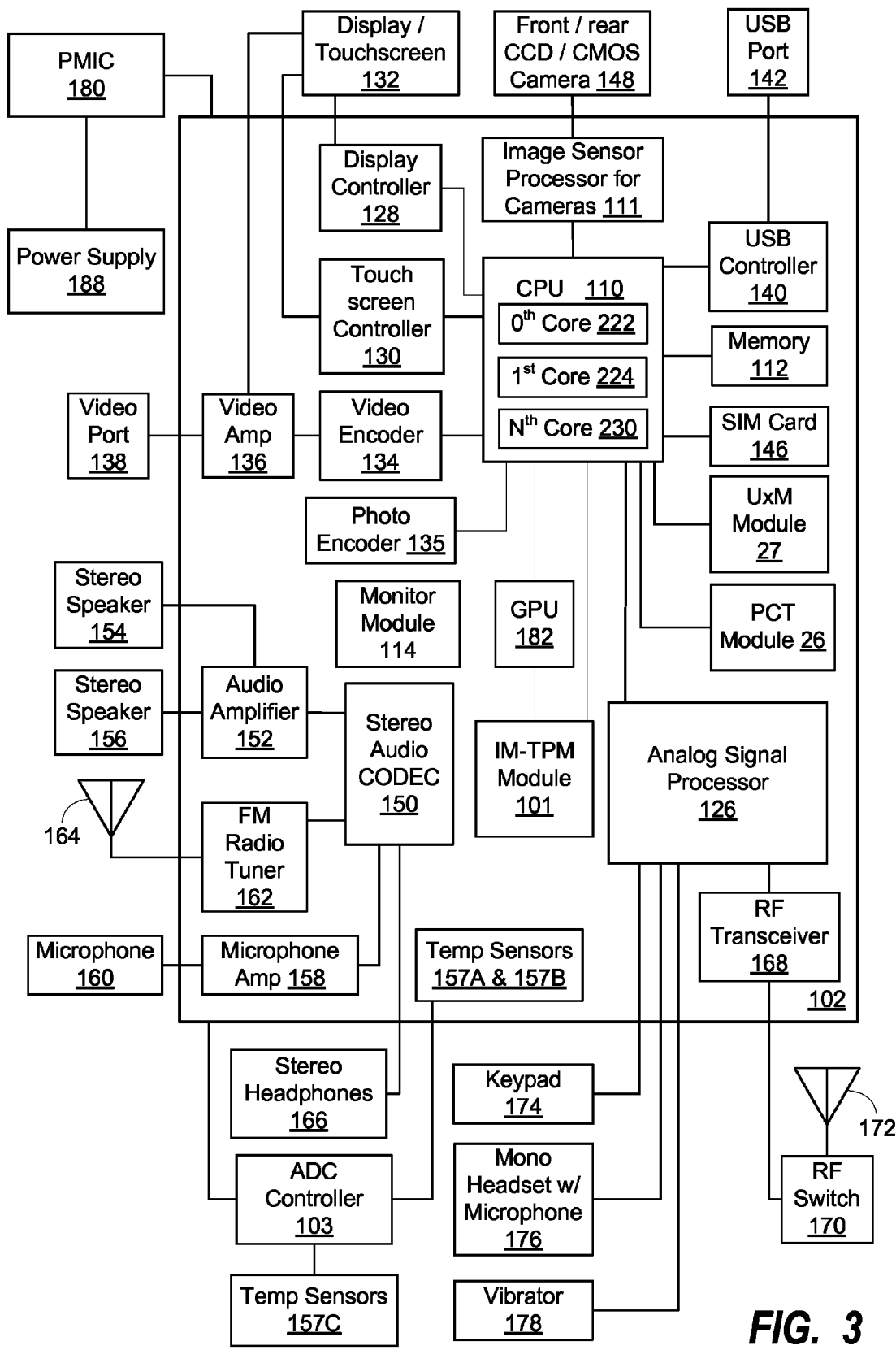
FIG. 3 is a functional block diagram illustrating an exemplary, non-limiting aspect of the PCD of FIG. 2 in the form of a wireless telephone for implementing methods and systems for intelligent multimedia-based thermal power management.

FIG. 3 is a functional block diagram illustrating an exemplary, non-limiting aspect of the PCD 100 of FIG. 2 in the form of a wireless telephone for implementing methods and systems for intelligent multimedia-based thermal power management. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the PCT module 26, Ux model module 27 and IM-TPM module 101 may be collectively responsible for selecting and making adjustments to visual multimedia parameters associated with multimedia processing components, such as GPU 182, such that power consumption (and, by extension, thermal energy generation) is managed and user experience is optimized.

The monitor module 114 communicates with multiple operational sensors (e.g., thermal sensors 157A, 157B) distributed throughout the on-chip system 102 and with the CPU 110 of the PCD 100 as well as with the Ux model module 27 and PCT module 26. In some embodiments, monitor module 114 may also monitor skin temperature sensors 157C for temperature readings associated with a touch temperature of PCD 100. In other embodiments, monitor module 114 may infer touch temperatures based on a likely delta with readings taken by on chip temperature sensors 157A, 157B. The PCT module 26 may work with the monitor module 114 to identify temperature thresholds that have been exceeded and instruct the application of visual multimedia parameter adjustments associated with power consuming components within chip 102 in an effort to reduce the temperatures without unnecessarily impacting user experience.

As illustrated in FIG. 3, a display controller 128 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 3, a universal serial bus ("USB") controller 140 is coupled to the CPU 110. Also, a USB port 142 is coupled to the USB controller 140. A memory 112 and a subscriber identity module (SIM) card 146 may also be coupled to the CPU 110. Further, as shown in FIG. 3, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 3, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 3 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 3 further indicates that a radio frequency ("RF") transceiver 168 may be coupled to the analog signal processor 126. An RF switch 170 may be coupled to the RF transceiver 168 and an RF antenna 172. As shown in FIG. 3, a keypad 174 may be coupled to the analog signal processor 126. Also, a mono headset with a microphone 176 may be coupled to the analog signal processor 126. Further, a vibrator device 178 may be coupled to the analog signal processor 126. FIG. 3 also shows that a power supply 188, for example a battery, is coupled to the on-chip system 102 through power management integrated circuit ("PMIC') 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The PCT module(s) 26, Ux model module(s) 27 and/or IM-TPM module(s) 101 may comprise software which is executed by the CPU 110. However, the PCT module(s) 26, Ux model module(s) 27 and IM-TPM module(s) 101 may also be formed from hardware and/or firmware without departing from the scope of the invention. The PCT module 26, Ux model module 27 and IM-TPM module 101 may be collectively responsible for selecting and making adjustments to visual multimedia parameters associated with multimedia processing components, such as GPU 182, such that power consumption (and, by extension, thermal energy generation) is managed and user experience is optimized.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more PCT module(s) 26, Ux model module(s) 27 and/or IM-TPM module(s) 101. These instructions that form the module(s) 101, 26, 27 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 4:
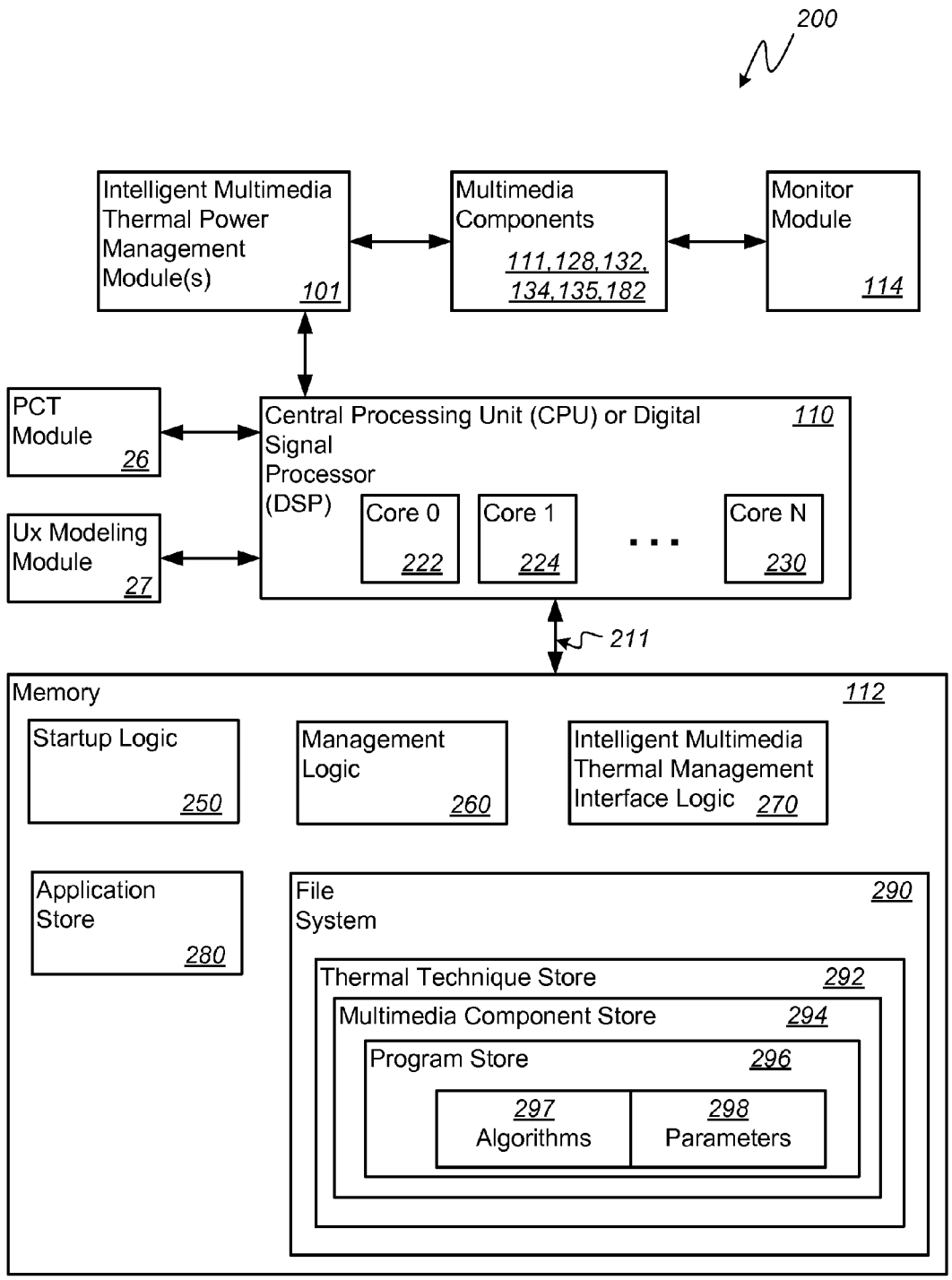
FIG. 4 is a schematic diagram illustrating an exemplary software architecture of the PCD of FIG. 3 for intelligent multimedia-based thermal power management.

FIG. 4 is a schematic diagram illustrating an exemplary software architecture of the PCD 100 of FIG. 3 for intelligent multimedia-based thermal power management. Any number of algorithms may form or be part of at least one intelligent multimedia thermal power management policy that may be applied by the PCT module(s) 26, Ux model module(s) 27 and/or IM-TPM module(s) 101 when certain thermal conditions are met, however, in a preferred embodiment the PCT module(s) 26, Ux model module(s) 27 and IM-TPM module(s) 101 work together to incrementally adjust settings of visual multimedia parameters 28 associated with multimedia processing components including, but not limited to, display controller 128, GPU 182, display 132, a video/photo encoder 134,135, and an image sensor processor for front/rear cameras 111.

As illustrated in FIG. 4, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the PCT module(s) 26, Ux model module(s) 27 and/or IM-TPM module(s) 101 that may comprise software and/or hardware. If embodied as software, the module(s) 26, 27, 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 4, it should be noted that one or more of startup logic 250, management logic 260, intelligent multimedia thermal power management interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the intelligent multimedia thermal power management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 is a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program based on the comparison, by the PCT module 26, of various temperature measurements or power consumption levels with threshold temperature settings or power budget settings associated with a multimedia processing component or aspect. An exemplary select program can be found in the program store 296 of the embedded file system 290 and is defined by a specific combination of an intelligent multimedia algorithm 297 and a set of parameters 298. The exemplary select program, when executed by one or more of the core processors in the CPU 110 may operate in accordance with one or more signals provided by the monitor module 114 in combination with control signals provided by the one or more PCT module(s) 26, Ux model module(s) 27 and/or IM-TPM module(s) 101 to adjust the setting associated with a particular visual multimedia parameter "up" or "down."

The management logic 260 includes one or more executable instructions for terminating an intelligent multimedia thermal power management program, as well as selectively identifying, loading, and executing a more suitable replacement program. The management logic 260 is arranged to perform these functions at run time or while the PCD 100 is powered and in use by an operator of the device. A replacement program can be found in the program store 296 of the embedded file system 290 and, in some embodiments, may be defined by a specific combination of an intelligent multimedia algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores to adjust the settings of one or more visual multimedia parameters 28 associated with multimedia processing components 128, 182 and 132.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all visual multimedia parameter adjustments in the display 132 during evening hours. By way of further example, the inputs may include a change to the management logic 260 that instructs the PCD 100 to apply a desired program when a certain gaming application is running.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and intelligent multimedia algorithms 297 used by the PCD 100. As shown in FIG. 4, the store 292 includes a multimedia component store 294, which includes a program store 296, which includes one or more intelligent multimedia thermal power management programs.

Figure 5A:
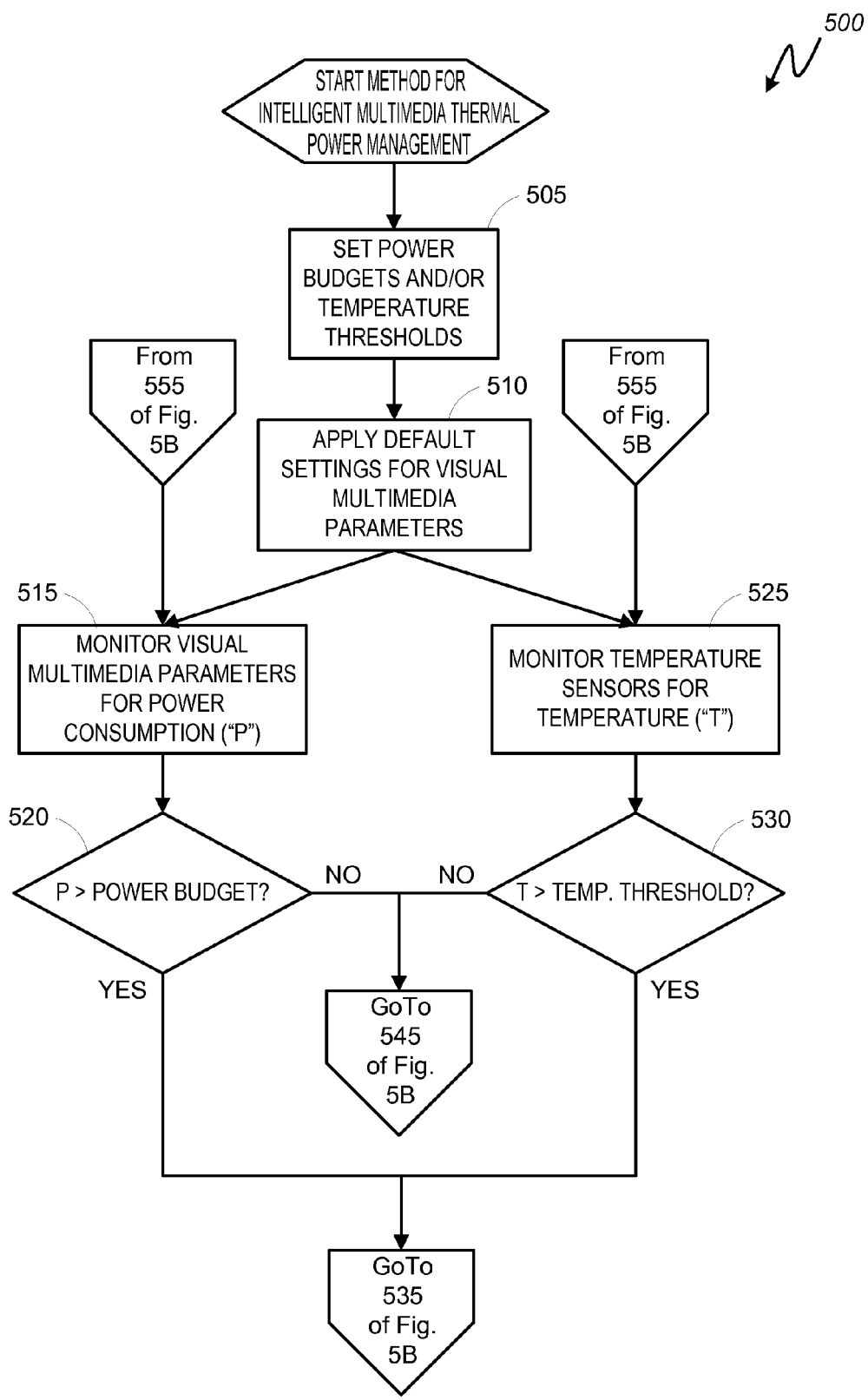
FIGS. 5A-5B depict a logical flowchart illustrating a method for intelligent multimedia-based management of thermal energy generation in the PCD of FIG. 2 through selective adjustment of one or more visual multimedia parameters.
Figure 5B:
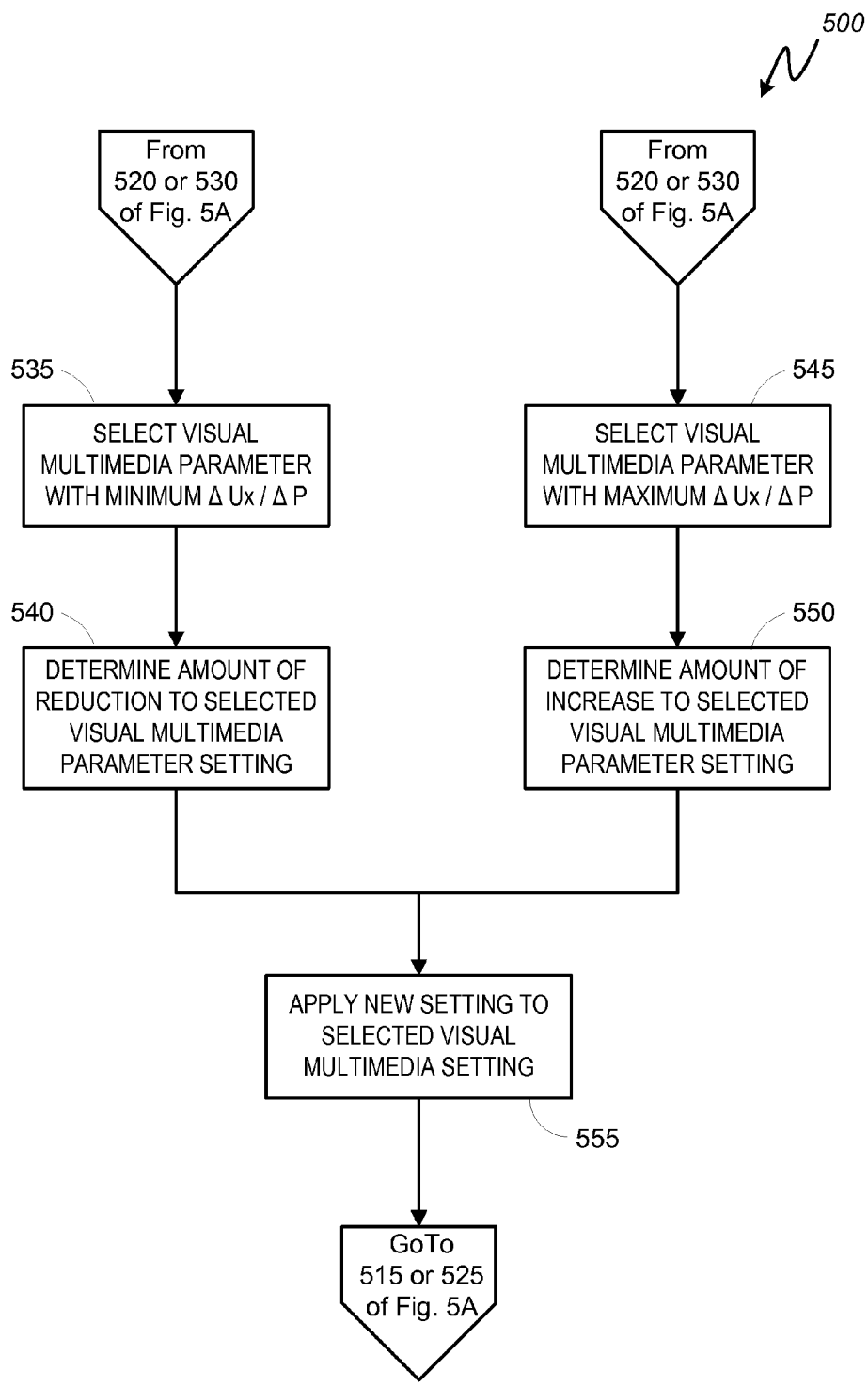

FIGS. 5A-5B depict a logical flowchart illustrating a method 500 for intelligent multimedia-based management of thermal energy generation in the PCD 100 of FIG. 2 through selective adjustment of one or more visual multimedia parameters 28. Method 500 of FIG. 5 starts with a first block 505 where predefined power budget(s) and/or temperature thresholds associated with sensors 157 are set. As explained above, the monitor module 114 may monitor various temperature sensors 157 and/or active visual parameter settings. At block 510, default settings for visual multimedia parameters 28 are set such that multimedia workloads and multimedia output QoS are determined. Depending on the particular embodiment, from block 510 the method 500 may proceed to either or both of blocks 515 and 525.

At block 515, the monitor module 114 monitors the active settings of the various visual multimedia parameters 28 and supplies associated data to the PCT module 26 which, based on the active settings, calculates an aggregate power consumption level associated with the various multimedia processing components. At decision block 520, the PCT module 26 determines whether the aggregate power consumption exceeds the power budget set at block 505. If the aggregate power consumption does exceed the power budget, then the "yes" branch is followed to block 535 of FIG. 5B. If the aggregate power consumption does not exceed the power budget, then the "no" branch is followed to block 545 of FIG. 5B.

Returning to block 510, the process 500 could alternatively, or simultaneously, proceed to block 525 where the monitor module monitors the temperature readings generated by various temperature sensors 157 and supplies associated data to the PCT module 26 which determines if one or more temperature thresholds have been exceeded. At decision block 530, the PCT module 26 determines whether a temperature reading exceeds a temperature threshold set at block 505. If the temperature reading does exceed a temperature threshold, then the "yes" branch is followed to block 535 of FIG. 5B. If the temperature reading does not exceed a temperature threshold, then the "no" branch is followed to block 545 of FIG. 5B.

If the method 500 dictates that either or both of the "yes" branches are followed from blocks 520, 530, then the PCT module 26 has determined that power consumption associated with multimedia load in the PCD 100 should be reduced and the method proceeds to block 535. At block 535, the Ux model module 27 queries the LUT 29 to map active visual multimedia parameter settings to appropriate visual multimedia parameter graphs. As explained above, by doing so the Ux model module 27 may compare slopes of tangents for each of the active settings and select for adjustment the visual multimedia parameter that provides opportunity for a minimum degradation in user experience per unit decrease in power consumption. Subsequently, at block 540, the Ux model module 27 determines the amount of setting adjustment that is warranted and forwards the instruction to the IM-TPM module 101. At block 555, the IM-TPM module 101 applies the new visual multimedia parameter setting and the method 500 returns to blocks 515, 525 of FIG. 5A.

Returning to FIG. 5A, if the method 500 dictates that either or both of the "no" branches are followed from blocks 520, 530, then the PCT module 26 has determined that power consumption associated with multimedia load in the PCD 100 may be increased and the method proceeds to block 545. At block 545, the Ux model module 27 queries the LUT 29 to map active visual multimedia parameter settings to appropriate visual multimedia parameter graphs. As explained above, by doing so the Ux model module 27 may compare slopes of tangents for each of the active settings and select for adjustment the visual multimedia parameter that provides opportunity for a maximum positive change in user experience per unit increase in power consumption. Subsequently, at block 550, the Ux model module 27 determines the amount of setting adjustment that is warranted and forwards the instruction to the IM-TPM module 101. At block 555, the IM-TPM module 101 applies the new visual multimedia parameter setting and the method 500 returns to blocks 515, 525 of FIG. 5A.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for intelligent multimedia-based thermal power management in a portable computing device ("PCD"), the method comprising:

monitoring a condition in the PCD associated with power consumption;

comparing the condition to a predefined threshold associated with the condition;

based on the comparison of the condition to the predefined threshold, determining an adjustment to power consumption;

receiving data indicative of active settings of a plurality of visual multimedia parameters, wherein the setting of each visual multimedia parameter contributes to an overall multimedia workload in the PCD;

querying performance graphs for each of the visual multimedia parameters and mapping the active setting data of each visual multimedia parameter to its respective curve, wherein the active setting data defines a tangent with a slope;

comparing the tangent slopes associated with each visual multimedia parameter;

based on the comparison of tangent slopes, selecting a first visual multimedia parameter; and adjusting the active setting of the first visual multimedia parameter, wherein adjusting the active setting modifies the overall multimedia workload such that power consumption in the PCD is adjusted.

2. The method of claim 1, wherein:

determining an adjustment to power consumption comprises determining a reduction in power consumption;

selecting a first visual multimedia parameter based on the comparison of tangent slopes comprises selecting the visual multimedia parameter for which adjustment of the active setting will provide the least detrimental impact on user experience per unit reduction in power consumption; and modifying the overall multimedia workload comprises reducing the overall multimedia workload such that the power consumption in the PCD is reduced.

3. The method of claim 2, further comprising:

determining that an additional reduction in power consumption in the PCD is warranted;

based on the comparison of tangent slopes, selecting a second visual multimedia parameter; and adjusting the active setting of the second visual multimedia parameter, wherein adjusting the active setting modifies the overall multimedia workload such that power consumption in the PCD is further reduced.

4. The method of claim 1, wherein:
determining an adjustment to power consumption comprises determining an increase in power consumption;
selecting a first visual multimedia parameter based on the comparison of tangent slopes comprises selecting the visual multimedia parameter for which adjustment of the active setting will provide the most positive impact on user experience per unit increase in power consumption; and
modifying the overall multimedia workload comprises increasing the overall multimedia workload such that power consumption in the PCD is increased.

5. The method of claim 4, further comprising:
determining that an additional increase in power consumption in the PCD is acceptable;
based on the comparison of tangent slopes, selecting a second visual multimedia parameter; and
adjusting the active setting of the second visual multimedia parameter, wherein adjusting the active setting modifies the overall multimedia workload such that power consumption in the PCD is further increased.

6. The method of claim 1, wherein the first visual multimedia parameter is associated with a frame per second processing rate.

7. The method of claim 1, wherein the first visual multimedia parameter is associated with a color depth setting.

8. The method of claim 1, wherein the first visual multimedia parameter is associated with an image dynamics algorithm selection.

9. The method of claim 1, wherein the first visual multimedia parameter is associated with a display brightness setting.

10. The method of claim 1, wherein the first visual multimedia parameter is associated with a resolution scaling ratio.

11. A computer system for intelligent multimedia-based thermal power management in a portable computing device ("PCD"), the system comprising:
a power consumption and temperature ("PCT") module configured to:
monitor a condition in the PCD associated with power consumption;
compare the condition to a predefined threshold associated with the condition; and
based on the comparison of the condition to the predefined threshold, determine an adjustment to power consumption; and
a user experience ("Ux") modeling module configured to:
receive data indicative of active settings of a plurality of visual multimedia parameters, wherein the setting of each visual multimedia parameter contributes to an overall multimedia workload in the PCD;
query performance graphs for each of the visual multimedia parameters and map the active setting data of each visual multimedia parameter to its respective curve, wherein the active setting data defines a tangent with a slope;
compare the tangent slopes associated with each visual multimedia parameter; and
based on the comparison of tangent slopes, select a first visual multimedia parameter; and
an intelligent multimedia thermal policy manager ("IM-TPM") module configured to:

adjust the active setting of the first visual multimedia parameter, wherein adjusting the active setting modifies the overall multimedia workload such that power consumption in the PCD is adjusted.

12. The system of claim 11, wherein:
the PCT module being configured to determine an adjustment to power consumption comprises being configured to determine a reduction in power consumption;
the Ux modeling module being configured to select a first visual multimedia parameter based on the comparison of tangent slopes comprises being configured to select the visual multimedia parameter for which adjustment of the active setting will provide the least detrimental impact on user experience per unit reduction in power consumption; and
the IM-TPM module being configured to modify the overall multimedia workload comprises being configured to reduce the overall multimedia workload such that the power consumption in the PCD is reduced.

13. The system of claim 12, further comprising:
the PCT module being configured to determine that an additional reduction in power consumption in the PCD is warranted;
the Ux modeling module being configured to select a second visual multimedia parameter based on the comparison of tangent slopes; and
the IM-TPM module being configured to adjust the active setting of the second visual multimedia parameter, wherein adjusting the active setting modifies the overall multimedia workload such that power consumption in the PCD is further reduced.

14. The system of claim 11, wherein:
the PCT module being configured to determine an adjustment to power consumption comprises being configured to determine an increase in power consumption;
the Ux modeling module being configured to select a first visual multimedia parameter based on the comparison of tangent slopes comprises being configured to select the visual multimedia parameter for which adjustment of the active setting will provide the most positive impact on user experience per unit increase in power consumption; and
the IM-TPM module being configured to modify the overall multimedia workload comprises being configured to increase the overall multimedia workload such that power consumption in the PCD is increased.

15. The system of claim 14, further comprising:
the PCT module being configured to determine that an additional increase in power consumption in the PCD is acceptable;
the Ux modeling module being configured to select a second visual multimedia parameter based on the comparison of tangent slopes; and
the IM-TPM module being configured to adjust the active setting of the second visual multimedia parameter, wherein adjusting the active setting modifies the overall multimedia workload such that power consumption in the PCD is further increased.

16. The system of claim 11, wherein the first visual multimedia parameter is associated with a frame per second processing rate.

17. The system of claim 11, wherein the first visual multimedia parameter is associated with a color depth setting.

18. The system of claim 11, wherein the first visual multimedia parameter is associated with an image dynamics algorithm selection.

19. The system of claim 11, wherein the first visual multimedia parameter is associated with a display brightness setting.

20. The system of claim 11, wherein the first visual multimedia parameter is associated with a resolution scaling ratio.

21. A computer system for intelligent multimedia-based thermal power management in a portable computing device, the system comprising:
   means for monitoring a condition in the PCD associated with power consumption;
   means for comparing the condition to a predefined threshold associated with the condition;
   means for determining an adjustment to power consumption based on the comparison of the condition to the predefined threshold;
   means for receiving data indicative of active settings of a plurality of visual multimedia parameters, wherein the setting of each visual multimedia parameter contributes to an overall multimedia workload in the PCD;
   means for querying performance graphs for each of the visual multimedia parameters and mapping the active setting data of each visual multimedia parameter to its respective curve, wherein the active setting data defines a tangent with a slope;
   means for comparing the tangent slopes associated with each visual multimedia parameter;
   means for selecting a first visual multimedia parameter based on the comparison of tangent slopes; and
   means for adjusting the active setting of the first visual multimedia parameter, wherein adjusting the active setting modifies the overall multimedia workload such that power consumption in the PCD is adjusted.

22. The computer system of claim 21, wherein:
   means for determining an adjustment to power consumption comprises means for determining a reduction in power consumption;
   means for selecting a first visual multimedia parameter based on the comparison of tangent slopes comprises means for selecting the visual multimedia parameter for which adjustment of the active setting will provide the least detrimental impact on user experience per unit reduction in power consumption; and
   means for modifying the overall multimedia workload comprises means for reducing the overall multimedia workload such that the power consumption in the PCD is reduced.

23. The computer system of claim 22, further comprising:
   means for determining that an additional reduction in power consumption in the PCD is warranted;
   means for selecting a second visual multimedia parameter based on the comparison of tangent slopes; and
   means for adjusting the active setting of the second visual multimedia parameter, wherein adjusting the active setting modifies the overall multimedia workload such that power consumption in the PCD is further reduced.

24. The computer system of claim 21, wherein:
   means for determining an adjustment to power consumption comprises means for determining an increase in power consumption;
   means for selecting a first visual multimedia parameter based on the comparison of tangent slopes comprises means for selecting the visual multimedia parameter for which adjustment of the active setting will provide the most positive impact on user experience per unit increase in power consumption; and
   means for modifying the overall multimedia workload comprises means for increasing the overall multimedia workload such that power consumption in the PCD is increased.

25. The computer system of claim 24, further comprising:
   means for determining that an additional increase in power consumption in the PCD is acceptable;
   means for selecting a second visual multimedia parameter based on the comparison of tangent slopes; and
   means for adjusting the active setting of the second visual multimedia parameter, wherein adjusting the active setting modifies the overall multimedia workload such that power consumption in the PCD is further increased.

26. The computer system of claim 21, wherein the first visual multimedia parameter is associated with a frame per second processing rate.

27. The computer system of claim 21, wherein the first visual multimedia parameter is associated with a color depth setting.

28. The computer system of claim 21, wherein the first visual multimedia parameter is associated with an image dynamics algorithm selection.

29. The computer system of claim 21, wherein the first visual multimedia parameter is associated with a display brightness setting.

30. The computer system of claim 21, wherein the first visual multimedia parameter is associated with a resolution scaling ratio.

31. A computer program product comprising a computer usable device having a computer readable program code embodied therein, said computer readable program code adapted to be executed to implement a method for intelligent multimedia-based thermal power management in a portable computing device, said method comprising:
   monitoring a condition in the PCD associated with power consumption;
   comparing the condition to a predefined threshold associated with the condition;
   based on the comparison of the condition to the predefined threshold, determining an adjustment to power consumption;
   receiving data indicative of active settings of a plurality of visual multimedia parameters, wherein the setting of each visual multimedia parameter contributes to an overall multimedia workload in the PCD;
   querying performance graphs for each of the visual multimedia parameters and mapping the active setting data of each visual multimedia parameter to its respective curve, wherein the active setting data defines a tangent with a slope;
   comparing the tangent slopes associated with each visual multimedia parameter;
   based on the comparison of tangent slopes, selecting a first visual multimedia parameter; and
   adjusting the active setting of the first visual multimedia parameter, wherein adjusting the active setting modifies the overall multimedia workload such that power consumption in the PCD is adjusted.

32. The computer program product of claim 31, wherein:
   determining an adjustment to power consumption comprises determining a reduction in power consumption;
   selecting a first visual multimedia parameter based on the comparison of tangent slopes comprises selecting the visual multimedia parameter for which adjustment of the active setting will provide the least detrimental impact on user experience per unit reduction in power consumption; and modifying the overall multimedia workload comprises reducing the overall multimedia workload such that the power consumption in the PCD is reduced.

33. The computer program product of claim 32, further comprising:
   determining that an additional reduction in power consumption in the PCD is warranted;
   based on the comparison of tangent slopes, selecting a second visual multimedia parameter; and
   adjusting the active setting of the second visual multimedia parameter, wherein adjusting the active setting modifies the overall multimedia workload such that power consumption in the PCD is further reduced.

34. The computer program product of claim 31, wherein:
   determining an adjustment to power consumption comprises determining an increase in power consumption;
   selecting a first visual multimedia parameter based on the comparison of tangent slopes comprises selecting the visual multimedia parameter for which adjustment of the active setting will provide the most positive impact on user experience per unit increase in power consumption; and
   modifying the overall multimedia workload comprises increasing the overall multimedia workload such that power consumption in the PCD is increased.

35. The computer program product of claim 34, further comprising:
   determining that an additional increase in power consumption in the PCD is acceptable;
   based on the comparison of tangent slopes, selecting a second visual multimedia parameter; and
   adjusting the active setting of the second visual multimedia parameter, wherein adjusting the active setting modifies the overall multimedia workload such that power consumption in the PCD is further increased.

36. The computer program product of claim 31, wherein the first visual multimedia parameter is associated with a frame per second processing rate.

37. The computer program product of claim 31, wherein the first visual multimedia parameter is associated with a color depth setting.

38. The computer program product of claim 31, wherein the first visual multimedia parameter is associated with an image dynamics algorithm selection.

39. The computer program product of claim 31, wherein the first visual multimedia parameter is associated with a display brightness setting.

40. The computer program product of claim 31, wherein the first visual multimedia parameter is associated with a resolution scaling ratio.

* * * * *